United States Patent
Miyamoto et al.

(10) Patent No.: US 9,041,258 B2
(45) Date of Patent: May 26, 2015

(54) MACHINE TOOL

(75) Inventors: Satoshi Miyamoto, Nabari (JP);
Satohiro Izumi, Iga (JP); Shinji Yonemitsu, Iga (JP)

(73) Assignee: DMG MORI SEIKI CO., LTD., Yamatokoriyama-Shi, Nara (JP)

( * ) Notice: Subject to any disclaimer, the term of this patent is extended or adjusted under 35 U.S.C. 154(b) by 1063 days.

(21) Appl. No.: 12/967,125

(22) Filed: Dec. 14, 2010

(65) Prior Publication Data
US 2011/0185778 A1    Aug. 4, 2011

(30) Foreign Application Priority Data
Feb. 4, 2010    (JP) ................................ 2010-022878

(51) Int. Cl.
| E05B 65/00 | (2006.01) |
| B23Q 11/08 | (2006.01) |
| B23Q 11/00 | (2006.01) |
| F16P 3/08  | (2006.01) |

(52) U.S. Cl.
CPC ............ *B23Q 11/08* (2013.01); *B23Q 11/0078* (2013.01); *F16P 3/08* (2013.01)

(58) Field of Classification Search
CPC .......... B23Q 11/0085; B23Q 11/0078; B23Q 11/00; B23Q 11/0089; B23Q 11/08; B23Q 11/0866; B23Q 11/0891; B23Q 11/0092; F16P 3/00
USPC ......................................... 307/326, 327, 328
See application file for complete search history.

(56) References Cited

U.S. PATENT DOCUMENTS

| 3,915,273 | A | * | 10/1975 | Loschengruber ............. 192/135 |
| 4,033,218 | A | * | 7/1977  | Donatelle ..................... 83/478 |
| 4,114,001 | A | * | 9/1978  | Corfield .................. 200/50.06 |
| 4,366,688 | A | * | 1/1983  | Bennett ......................... 70/395 |
| 5,077,631 | A | * | 12/1991 | Cleary .......................... 361/192 |
| 5,396,122 | A | * | 3/1995  | Nesper ......................... 307/326 |
| 2001/0011055 | A1 | * | 8/2001 | Kuriki et al. ................... 483/16 |
| 2007/0204662 | A1 | * | 9/2007 | Pullmann et al. .............. 70/277 |
| 2009/0072631 | A1 | * | 3/2009 | Iida et al. ..................... 307/326 |

FOREIGN PATENT DOCUMENTS

| JP | 5-123937 A | 5/1993 |
| JP | 06-129596  | 5/1994 |
| JP | 07-197717  | 8/1995 |

\* cited by examiner

*Primary Examiner* — Rexford Barnie
*Assistant Examiner* — Elim Ortiz

(57) ABSTRACT

The present invention provides a machine tool making it possible that an operator needs to remove a key member from a predetermined position after an unlock condition of a door is established when a door lock mechanism brings the door into an unlocked state, meanwhile the operator can recognize the necessity of reattaching the key member to the predetermined position when the door lock mechanism brings the door into a locked state. In the machine tool, an interlock mechanism 5a allows a door lock mechanism 8 to bring a door 3 into the unlocked state in a state that the unlock condition of the door 3 is established and when the key member 9 is removed from the predetermined position and, after the door 3 is unlocked, allows the door lock mechanism 8 to bring the door 3 into the locked state only when the key member 9 is attached to the predetermined position in a state that the door closed state detection mechanism 7 detects that the door is located at the predetermined closed position.

3 Claims, 10 Drawing Sheets

MACHINE TOOL

BACKGROUND OF THE INVENTION

1. Field of the Invention

The present invention relates to a machine tool including an interlock mechanism allowing processing operation when a door is located at a closed position and is in a locked state.

2. Description of the Related Art

In a large-sized machine tool, an interlock mechanism is arranged for preventing a third person from starting processing operation by mistake when an operator is working in the machine tool.

Conventional interlock mechanisms of this type include, for example, one described in Japanese Patent Application Laid-open No. Hei 5-123937. In the prior art, the interlock mechanism is configured to shut a switch intervening in a power supply circuit such as a spindle motor or the like when the fact that the door is open is detected.

SUMMARY OF THE INVENTION

The conventional interlock mechanism has a problem, however, and the problem is that even when the operator is working inside the machine tool, a third person can switch the door into a closed state by moving the door to a closed position.

The present invention has been made in consideration of the above circumstances in the prior art, and an object of the present invention is to provide a machine tool making it possible to prevent processing operation from being started even when a third person brings a door into a closed state by mistake, and for the third person himself or herself to easily recognize that he or she brought the door into the closed state by mistake.

The present invention is a machine tool, including: a door configured to separate a processing area and an outside of the machine and to be openable/closable; a door closed state detection mechanism which detects that the door is located at a predetermined closed position; a door lock mechanism which locks or unlocks the door; and an interlock mechanism which allows processing operation when the door is located at the predetermined closed position and is in a locked state and allows the door lock mechanism to bring the door into an unlocked state in a state that an unlock condition of the door is established and when a key member is removed from a predetermined position and, after the door is unlocked, allows the door lock mechanism to bring the door into the locked state only when the key member is attached to the predetermined position in a state that the door closed state detection mechanism detects that the door is located at the predetermined closed position.

According to the present invention, the interlock mechanism is configured to be able to bring the door into the unlocked state in the state that the unlock condition of the door is established and when the key member is removed, and therefore will bring the door into the unlocked state only after processing operation of the machine tool is finished or after the rotation of the spindle is stopped and thus can prevent occurrence of sudden accidents such as falling, scattering and the like of the workpiece.

Further, once the door is unlocked, the door cannot be brought into the locked state unless the door is moved to the closed position and the key member is attached to the predetermined position, so that it is possible to prevent processing operation from being started by a third person closing the door by mistake and bringing the door into the locked state.

Further, the third person himself or herself can easily recognize that he or she closed the door by mistake, resulting in improved safety.

In a preferred embodiment of the present invention, the door lock mechanism has a keyhole into which the key member is able to be inserted, and the interlock mechanism allows the door lock mechanism to bring the door into the unlocked state when the key member is removed from the keyhole.

According to the preferred embodiment, the keyhole into which the key member is able to be inserted is provided in the door lock mechanism, so that after the operator opens the door, even if the third person tries to close the door in the state that the key member is kept inserted in the keyhole, the door cannot be closed because the key member is an obstacle, thus making it possible to more surely prevent the third person from closing the door when the operator is working in the machine tool. Further, the third person himself or herself can easily recognize that he or she tries to bring the door into the locked state by mistake, and the safety can be improved also from this point.

In another preferred embodiment of the present invention, a through hole through which the key member is able to be inserted into the keyhole only when the door is located at the predetermined closed position is formed in the door, and the interlock mechanism allows the door lock mechanism to bring the door into the unlocked state when the key member is removed from the keyhole and the through hole.

According to another preferred embodiment, since the through hole through which the key member is able to be inserted into the keyhole of the door lock mechanism only when the door is located at the predetermined closed position is formed in the door, the key member itself serves as a bolt holding the door in the closed state and can surely prevent the door from opening during processing operation, resulting in improved safety.

Further, when the door is in the open state, even if the third person tries to close the door by mistake in the state that the operator keeps the key member attached to either the door or the door lock mechanism, the door is never brought into the closed position because the key member is an obstacle, so that it is possible to prevent the door from being locked by mistake and processing operation from being started. Meanwhile, the third person can easily recognize that he or she tries to bring the door into the locked state by mistake because he or she cannot lock the door unless the key member is removed, and the safety can be improved also from this point.

In still another preferred embodiment of the present invention, the key member is configured to be able to transmit predetermined electronic information when the key member is attached to the predetermined position, and the interlock mechanism includes a receiving part receiving the predetermined electronic information from the key member, and allows the door lock mechanism to bring the door into the locked state only when the receiving part is changed from a state that the receiving part is not receiving the predetermined electronic information from the key member to a state that the receiving part is receiving the predetermined electronic information in the state that the door closed state detection mechanism detects that the door is located at the predetermined closed position.

According to still another preferred embodiment, since the interlock mechanism allows the door lock only when the receiving part is changed from a state that the receiving part is not receiving electronic information from the key member to a state that the receiving part is receiving the electronic information when the door is located at the closed position, the door is never brought into the locked state unless the key member is once removed from the attachment part and then attached again to the attachment part even when the operator enters the machine keeping the key member attached to the attachment part, so that if the third person closes the door by mistake, processing is never started, and the safety can be improved.

DETAILED DESCRIPTION OF THE PREFERRED EMBODIMENTS

Figure 1:
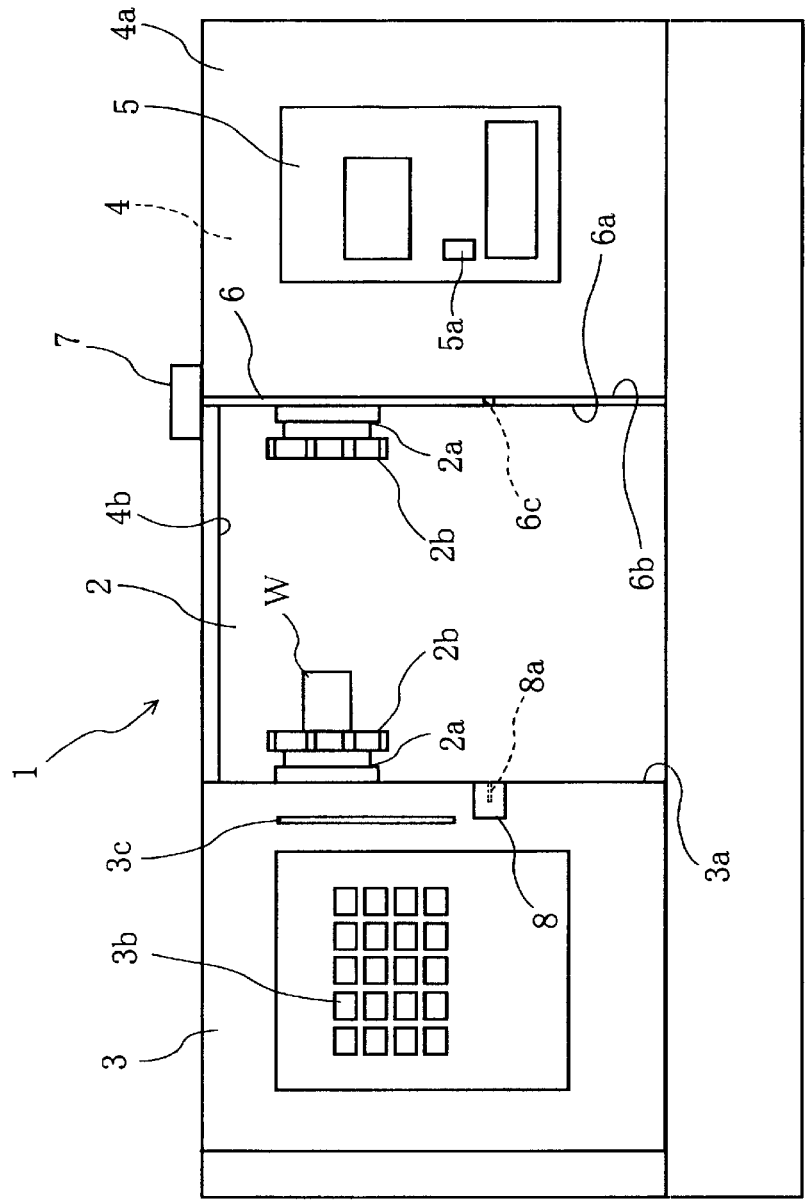
FIG. 1 is a front view of a machine tool according to a first embodiment of the present invention in a state that a door of the machine tool is open.

Hereinafter, embodiments of the present invention will be described based on the accompanying drawings.

First Embodiment

FIG. 1 to FIG. 6 are views for describing a machine tool according to a first embodiment of the present invention. The front, rear, left and right in this embodiment represent the front, rear, left, and right when viewing from the front side of the machine.

In the drawings, numeral 1 denotes a machine tool. This machine tool 1 includes a machine body 4 and a machine body cover 4a surrounding the machine body 4. The machine tool 1 has, in an almost middle portion of the machine body 4, a processing area 2 where rotationally driving spindles 2a, chucks 2b each gripping a workpiece W, tool posts (not shown) and so on are arranged. An opening 4b, corresponding to the processing area 2, of the body cover 4a is configured to be openable/closable by a door 3 separating the outside of the machine. A control board 5 is arranged on a right side portion of the machine body 4, and a flange 6 serving as a door stopper is arranged on a right edge portion of the opening 4b.

When a right end surface 3a of the door 3 is in contact with a left end surface 6a of the flange 6, a door closed state detection mechanism 7 judges that the door 3 is located at a predetermined closed position.

The door closed state detection mechanism 7 which detects that the door 3 is located at the predetermined closed position is arranged at an upper end portion of the right edge of the processing area 2. The door closed state detection mechanism 7 outputs a "door closed" signal or a "door open" signal to a later-described interlock mechanism 5a.

A door lock mechanism 8 which locks or unlocks the door 3 to/from the machine body 4 is arranged on the door 3. The door lock mechanism 8 outputs a "door locked" signal or a "door unlocked" signal to the interlock mechanism 5a. Further, a window 3b for observing a processing state is formed at a middle portion of the door 3, and a handle 3c is fixed at a right side portion of the door 3.

The door lock mechanism 8 has a keyhole 8a into which a key member 9 can be inserted, at a predetermined position, and the keyhole 8a is formed to extend leftward from a right end portion of the door lock mechanism 8.

Figure 3:
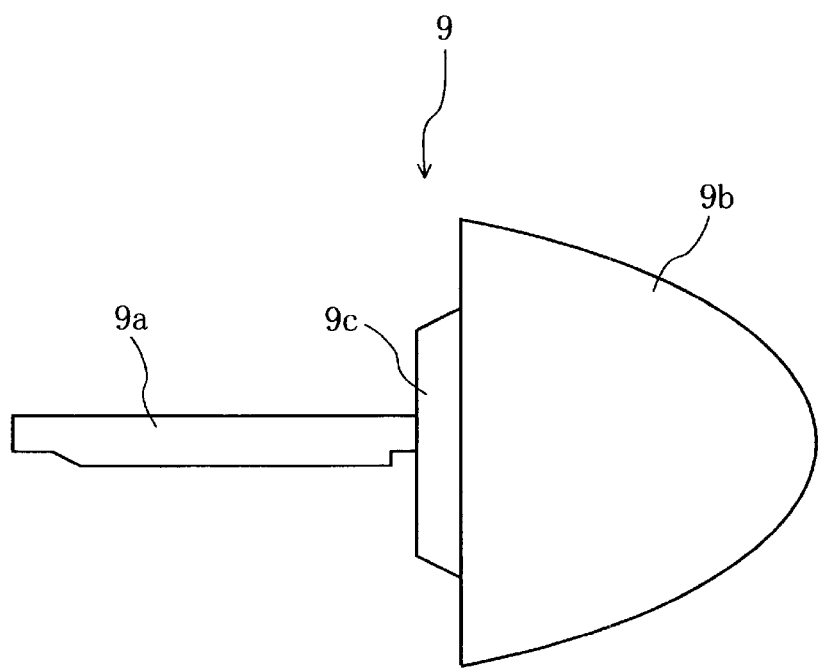
FIG. 3 is a front view of a key member of the first embodiment.
Figure 4:
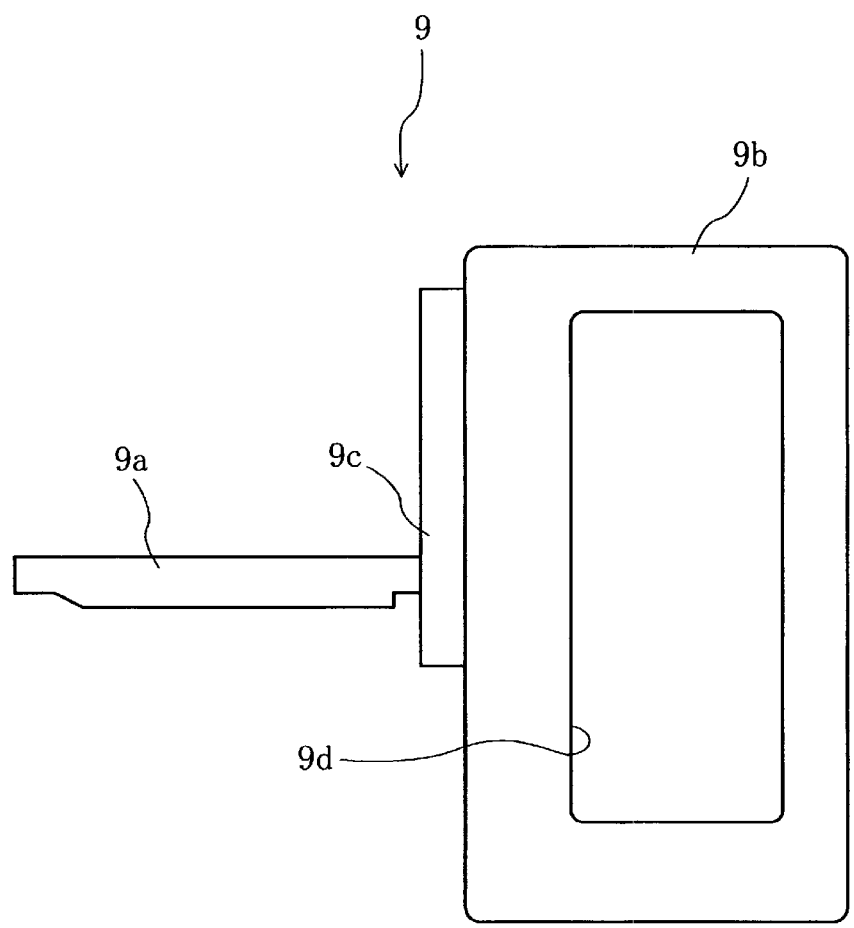
FIG. 4 is a front view of a modified example of the key member of the first embodiment.

The key member 9 is made of, for example, metal, and constituted of an insertion part 9a and a grip part 9b as shown in FIG. 3. The insertion part 9a is formed in a bar shape and fixed to a projecting part 9c formed on the grip part 9b. Further, the grip part 9b is formed in a substantially semi-elliptic plate shape. Note that the grip part 9b may be formed in a substantially rectangular parallelepiped plate shape having a through part 9d at its middle portion as shown in FIG. 4.

Figure 2:
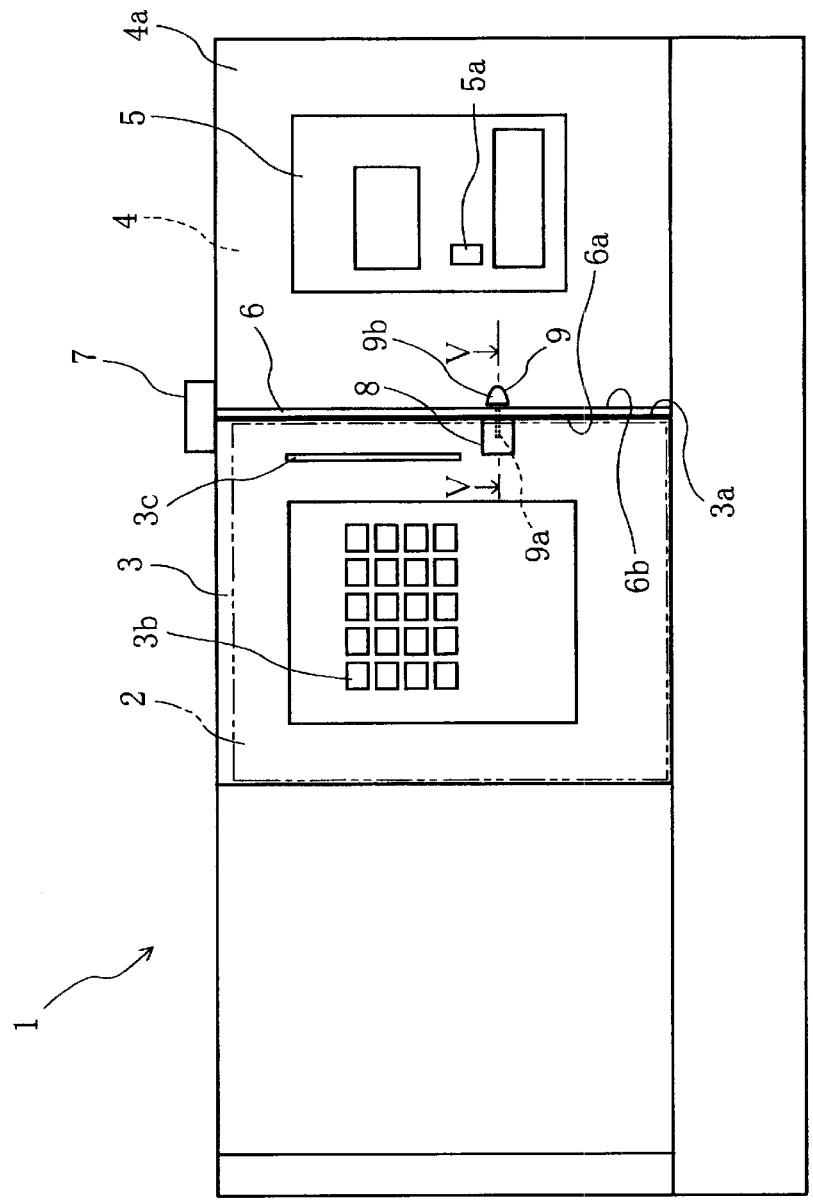
FIG. 2 is a front view of the door in a closed state of the first embodiment.
Figure 5:
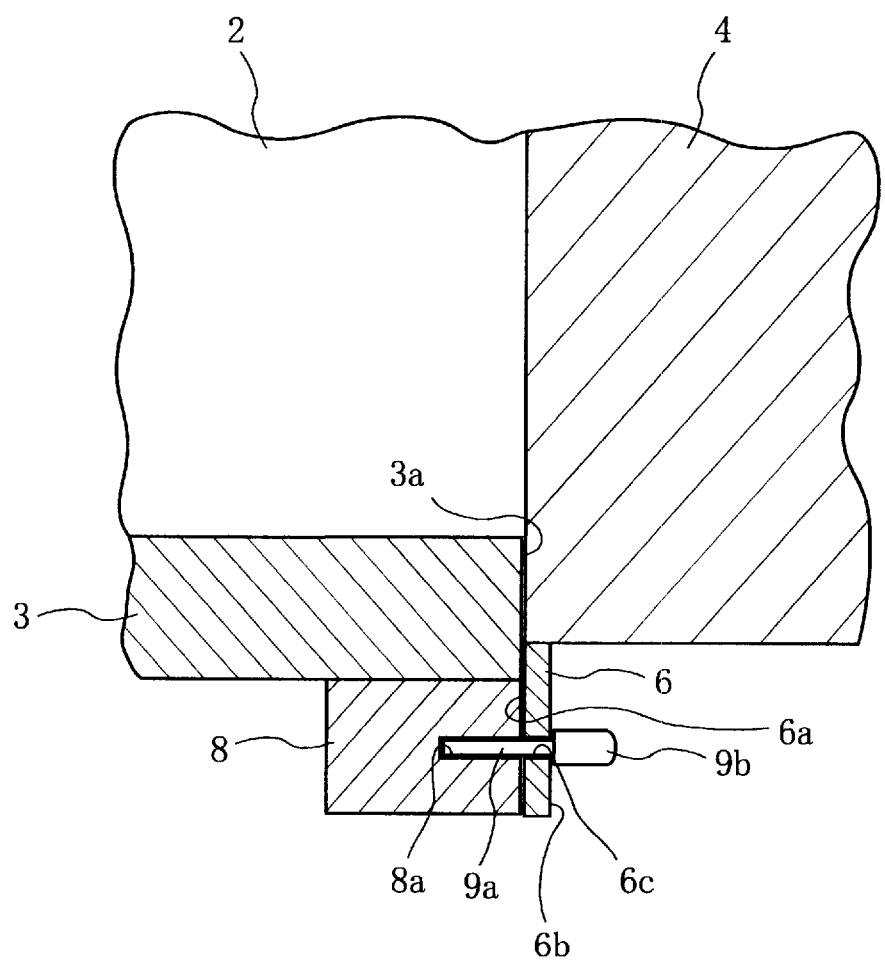
FIG. 5 is a sectional plan view showing a key member inserted state in the state that the door of the first embodiment is closed (a sectional view taken along a line V-V in FIG. 2)

The flange 6 has a through hole 6c for inserting the key member 9 and is configured such that when the door 3 is located at the predetermined closed position, the key member 9 can be inserted into the keyhole 8a from the side of a right end surface 6b of the flange 6 (see FIG. 2 and FIG. 5).

Figure 6:
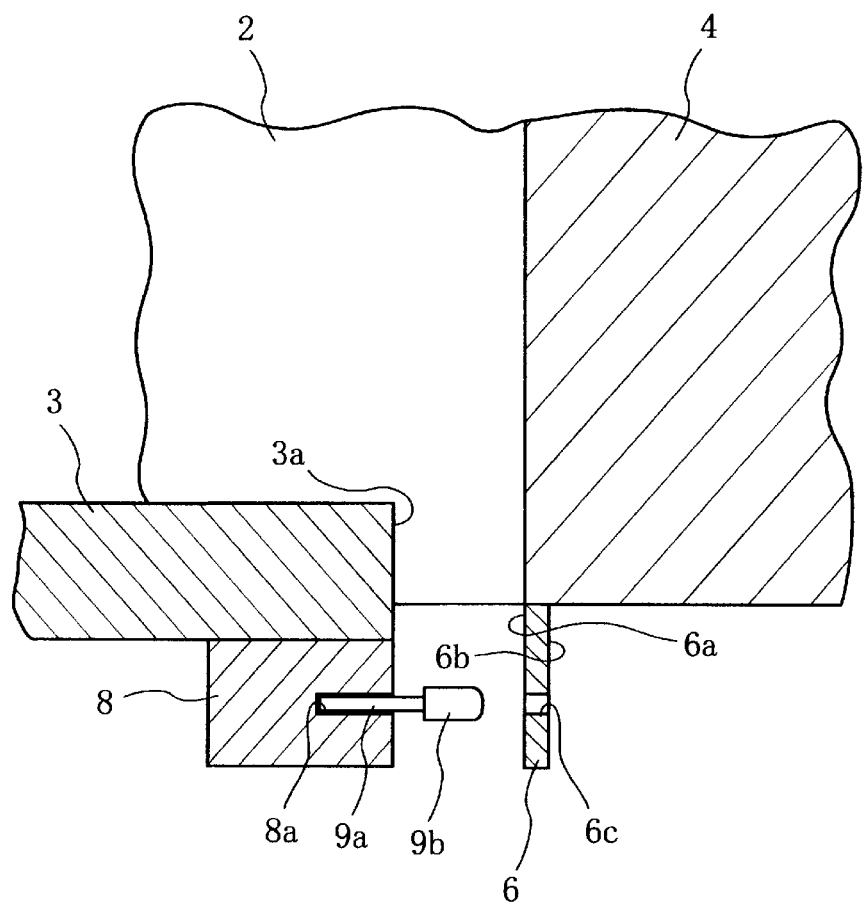
FIG. 6 is a sectional plan view showing the key member inserted state in the state that the door of the first embodiment is open (a sectional view taken along a line V-V in FIG. 2)

Note that the keyhole 8a is configured such that the key member 9 can be inserted thereinto even when the door 3 is in the open state (see FIG. 6).

Further, the door lock mechanism 8 transmits, to the interlock mechanism 5a, a "key attached" signal indicating that the key member 9 is attached to the keyhole 8a or a "key unattached" signal indicating that the key member 9 is unattached to the keyhole 8a.

On the control board 5, the interlock mechanism 5a is arranged. The interlock mechanism 5a allows processing operation by the spindle 2a or the like when the door 3 is located at the predetermined closed position and is in the locked state.

More specifically, the interlock mechanism 5a allows the door lock mechanism 8 to bring the door 3 into the unlocked state in a state that the unlock condition of the door 3 is established and when the key member 9 is removed from the keyhole 8a of the door lock mechanism 8. After the door 3 is once unlocked, the interlock mechanism 5a allows the door lock mechanism 8 to bring the door 3 into the locked state only when the key member 9 is attached to the keyhole 8a of the door lock mechanism 8 in a state that the door closed state detection mechanism 7 detects that the door 3 is located at the predetermined closed position.

The unlock condition of the door 3 here refers to, for example, the case where all processing operation of the workpiece is finished or the case where the workpiece processing is suspended halfway and the rotation of the spindle 2a or the like is stopped.

In the machine tool 1 in the first embodiment, to bring the door 3 into the unlocked state, an operator needs to remove the key member 9 from the keyhole 8a that is the predetermined position through the through hole 6c in the state that the unlock condition is established. By the operation of removing the key member 9, the operator will hold the key member 9 in his or her hand. Then, the operator opens the door 3 that has been brought into the unlocked state, enters the machine tool 1 holding the key member 9, and performs work.

During the work, even if a third person moves by mistake the door 3 to the predetermined closed position to perform processing, the interlock mechanism 5a never allows the locked stated of the door 3 unless the key member 9 held by the operator is inserted into the keyhole 8a through the through hole 6c.

Further, if the operator enters the machine tool 1 and performs work while keeping the key member 9 inserted in the keyhole 8a of the door 3 in the open state, when the third person tries to close the door 3 by mistake, the grip part 9b of the key member 9 is an obstacle, so that the door 3 is never brought to the predetermined closed position.

According to the first embodiment, the interlock mechanism 5a brings the door 3 into the unlocked state in the state that the unlock condition of the door 3 is established and when the key member 9 is removed, and therefore will bring the door 3 into the unlocked state only after the processing operation of the machine tool 1 is finished or after the rotation of the spindle 2a is stopped and thus can prevent occurrence of sudden accidents such as falling, scattering and the like of the workpiece.

Further, after the door 3 is once brought into the unlocked state, the door 3 cannot be brought into the locked state unless the door 3 is moved to the closed position and the key member 9 is inserted, so that even if a third person closes the door 3 by mistake, start of processing can be prevented. Further, the third person himself or herself can easily recognize that he or she closed the door by mistake, resulting in improved safety.

Furthermore, when the door 3 is in the open state, even if the third person tries to close the door 3 in the state that the key member 9 is kept inserted in the keyhole 8a, the door 3 is never brought to the closed position because the key member 9 is an obstacle, so that it is possible to prevent the door 3 from being locked by mistake and processing from being started also in this case.

Second Embodiment

Figure 7:
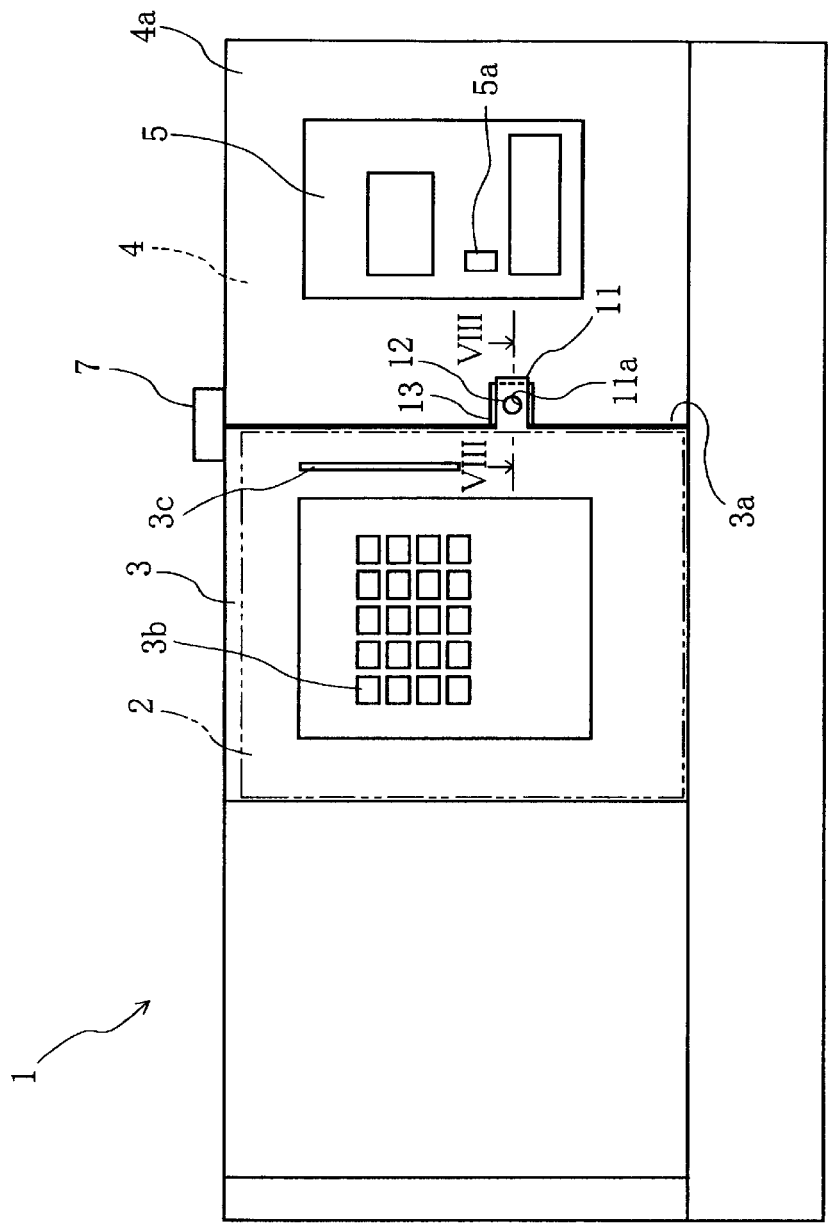
FIG. 7 is a front view of a machine tool according to a second embodiment of the present invention in a state that a door of the machine tool is closed.
Figure 8:
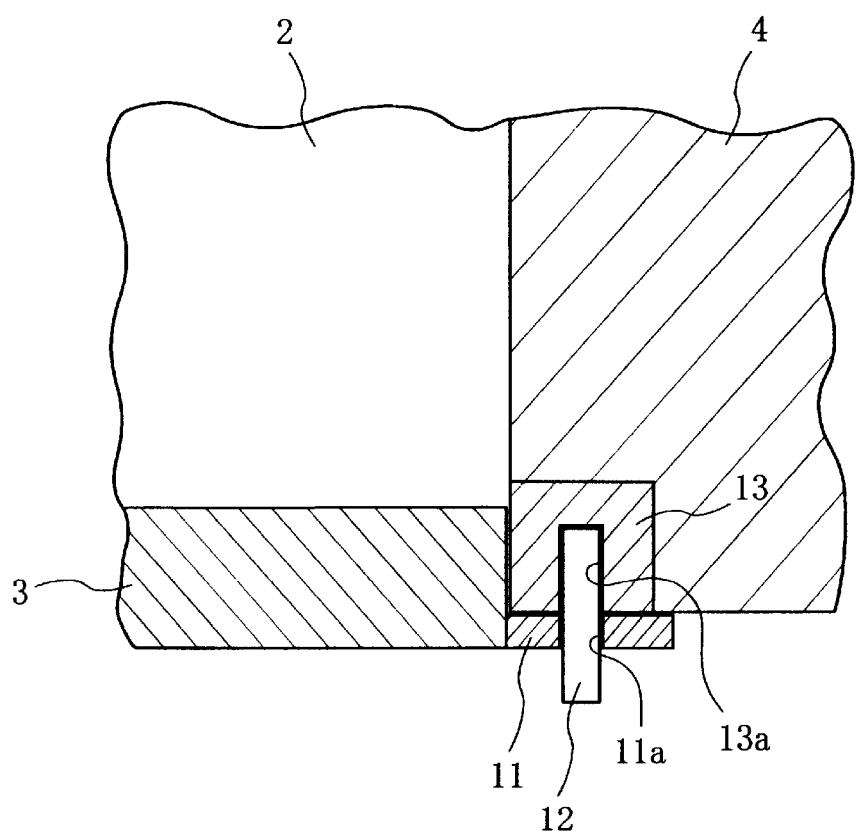
FIG. 8 is a sectional plan view showing a key member inserted state in the state that the door of the second embodiment is closed (a sectional view taken along a line VIII-VIII in FIG. 7)

FIG. 7 and FIG. 8 are views for describing a machine tool according to a second embodiment of the present invention. In the drawings, the same numerals or letters as those in FIG. 1 to FIG. 6 indicate the same or corresponding components.

In the machine tool 1 of the second embodiment, a projecting part 11 is formed to project rightward, at a middle portion at a right end portion of the door 3. At a middle portion of the projecting part 11, a through hole 11a for inserting a key member 12 is formed. Further, the projecting part 11 is located at a front surface of a right edge portion of the processing area 2 when the door 3 is located at the predetermined closed position.

At a middle portion of the machine body 4 at a right edge portion of the processing area 2, a door lock mechanism 13 is embedded. The door lock mechanism 13 has a keyhole 13a into which the key member 12 can be inserted and the keyhole 13a extends backward from the front surface of the machine.

When the door 3 is located at the predetermined closed position, the through hole 11a aligns with the keyhole 13a, and the key member 12 can be inserted, at this time, into the keyhole 13a through the through hole 11a and serves as a so-called bolt. Further, the key member 12 is made of, for example, metal and formed in a substantially bar shape.

The interlock mechanism 5a allows the door lock mechanism 13 to bring the door 3 into the unlocked state in the state that the unlock condition is established and when the key member 12 is removed from the keyhole 13a and the through hole 11a, and, after the door 3 is unlocked, the interlock mechanism 5a allows the door lock mechanism 13 to bring the door 3 into the locked state only when the key member 12 is attached to the keyhole 13a of the door lock mechanism 13 in the state that the door closed state detection mechanism 7 detects that the door 3 is located at the predetermined closed position.

According to the second embodiment, when the door 3 is located at the predetermined closed position, the key member 12 is inserted into the keyhole 13a through the through hole 11a of the door 3 and serves as a bolt, and therefore can surely prevent the door 3 from carelessly opening during processing operation.

Further, also in the second embodiment, the door 3 becomes openable in the state that the unlocked state of the door 3 is established and when the key member 12 is removed as in the first embodiment, so that the door 3 is secure from opening during the processing operation and the safety can be improved also from this point.

Further, once the door 3 is opened, the door 3 is never brought into the locked state unless the door 3 is moved to the closed position and the key member 12 is attached, so that it is possible to prevent the door 3 from being locked by mistake and processing from being started, resulting in improved safety.

Further, when the door is in the open state, even if a third person tries to close the door 3 by mistake in the state that the key member 12 is kept attached to either the door 3 or the door lock mechanism 13, the door 3 is never brought into the closed position because the key member 12 is an obstacle, so that it is possible to prevent the door from being locked by mistake and processing from being started also in this case. Further, the third person can easily recognize that he or she tries to bring the door into the locked state by mistake, resulting in improved safety.

Note that the door lock mechanism 13 is embedded in the machine body 4 and the projecting part 11 having the through hole 11a formed therein is provided at the door 3 in the second embodiment, but, as a matter of course, the door lock mechanism 13 may be embedded in the door 3 and the projecting part 11 having the through hole 11a formed therein may be provided at the machine body 4 such that the key member 12 can be attached only when the door 3 is located at the predetermined closed position.

Third Embodiment

Figure 9:
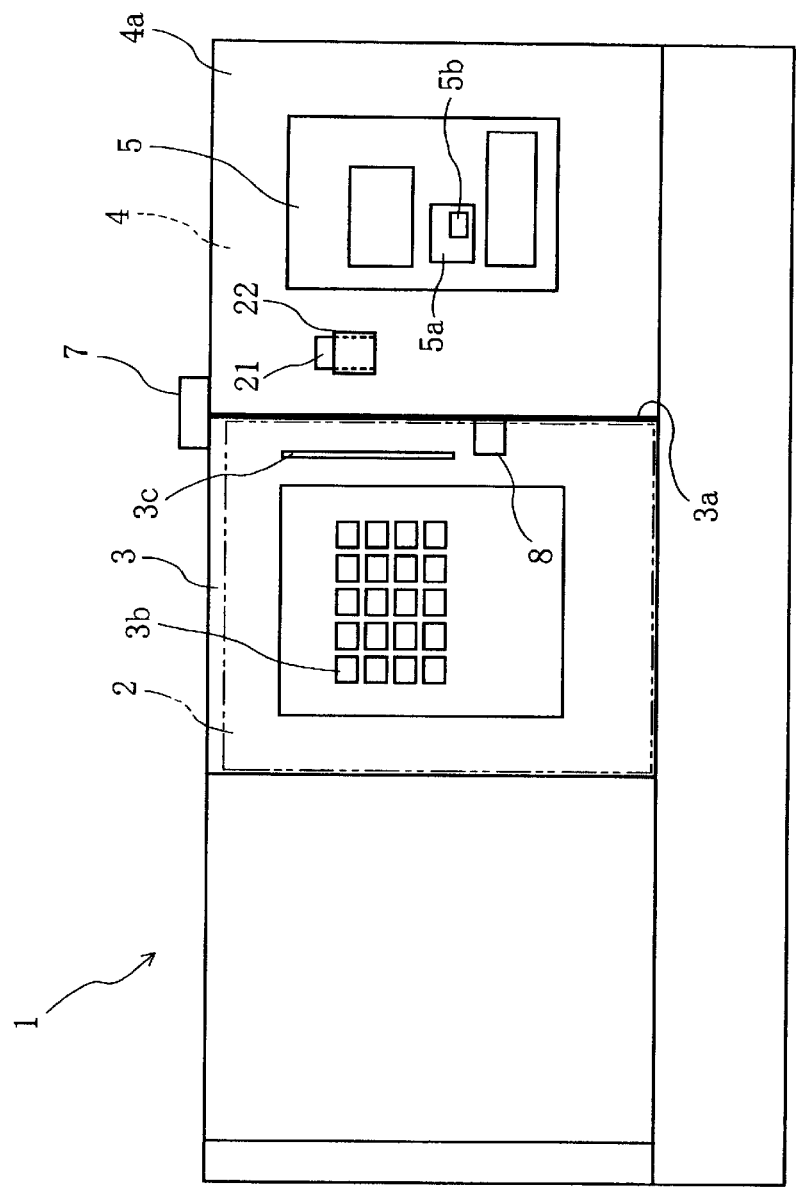
FIG. 9 is a front view of a machine tool according to a third embodiment of the present invention in a state that a door of the machine tool is closed.
Figure 10:
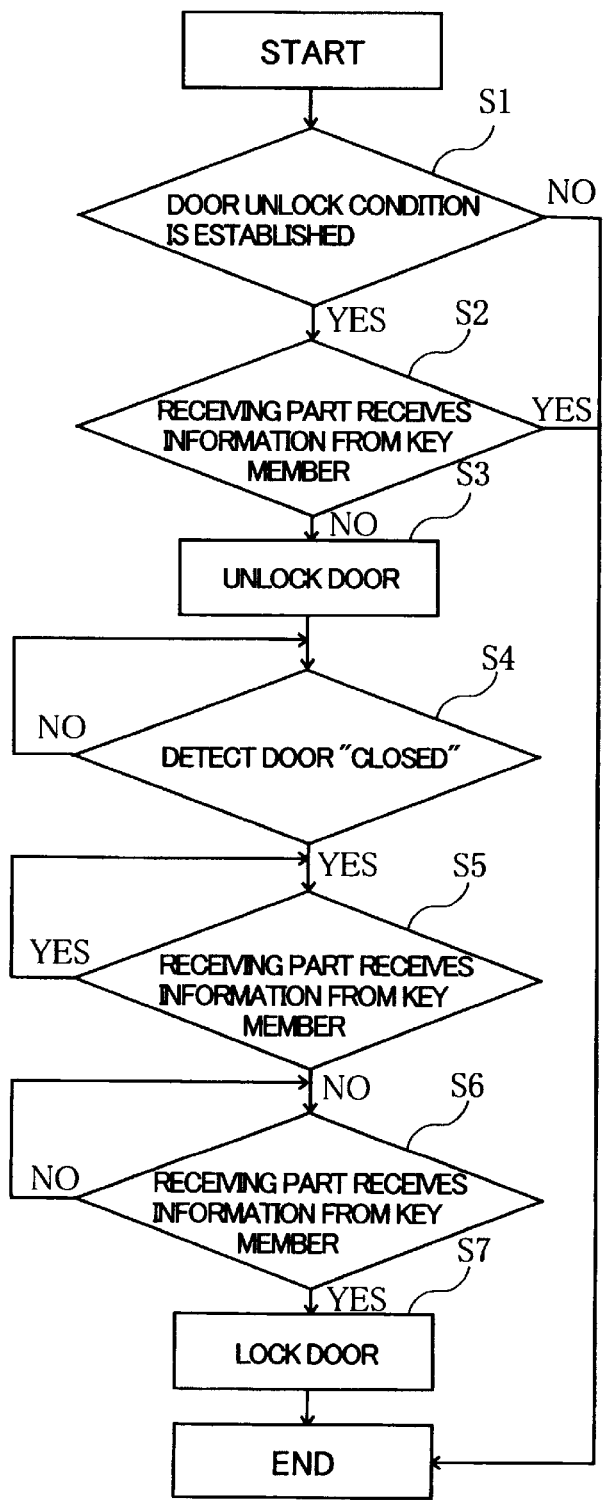
FIG. 10 is a chart showing a control flow of an interlock mechanism of the third embodiment.

FIG. 9 and FIG. 10 are views for describing a machine tool according to a third embodiment of the present invention. In the drawings, the same numerals or letters as those in FIG. 1 to FIG. 8 indicate the same or corresponding components.

In the machine tool 1 of the third embodiment, a key member 21 is configured to be able to transmit an "attached" signal (electronic information) indicating that the key member 21 is attached when the key member 21 is attached to a predetermined attachment part 22. The interlock mechanism 5a further includes a receiving part 5b receiving the "attached" signal from the key member 21.

The key member 21 is formed, for example, in a substantially rectangular card shape. Further, the attachment part 22 is formed in a substantially rectangular parallelepiped shape and has an inlet into which the key member 21 can be inserted.

The interlock mechanism 5a allows the door lock mechanism 8 to bring the door 3 into the locked state only when the interlock mechanism 5a is changed from a state that it is not receiving the "attached" signal from the key member 21 to a state that it is receiving the "attached" signal in the state that the door closed state detection mechanism 7 detects that the door 3 is located at the predetermined closed position.

The door-lock/door-unlock operation of the machine tool 1 in the third embodiment will be described based on a flowchart in FIG. 10.

In a state that the unlock condition of the door 3 is established (Step S1), when the operator removes the key member 21 from the attachment part 22, the predetermined electronic information ("attached" signal) from the key member 21 to the receiving part 5*b* is stopped (Step S2). Then, the interlock mechanism 5*a* allows the door lock mechanism 8 to bring the door 3 into the unlocked state, and the door lock mechanism 8 unlocks the door 3 (Step S3). Thus, the operator can open the door 3 that has been brought into the unlocked state, enter the machine tool 1 holding the removed key member 21, and perform working.

After the working is finished, when the operator moves the door 3 to the predetermined closed position, the door closed state detection mechanism 7 transmits the "closed" signal of the door 3 to the interlock mechanism 5*a* (Step S4).

Since the operator holds the key member 21, the "attached" signal from the key member 21 to the receiving part 5*b* is still stopped (Step S5), but when the operator inserts the key member 21 that the operator holds into the attachment part 22, the receiving part 5*b* receives the "attached" signal from the key member 21 (Step S6). This makes the interlock mechanism 5*a* allow the door lock mechanism 8 to bring the door 3 into the locked state, and the door lock mechanism 8 locks the door 3 (Step S7) so that processing can be started.

As described above, even if a third person moves the door 3 to the predetermined closed position by mistake in order to bring the door 3 into the locked state when the operator is working inside the machine tool 1, the door 3 is never brought into the locked state unless the key member 21 that the operator holds into the attachment part 22. Accordingly, it is possible to prevent processing from being started by mistake, ensuring the safety.

When the operator opens the door 3 (Steps S1 to S3) and then inserts the key member 21 again into the attachment part 22 and enters the machine tool 1 in that state here, the receiving part 5*b* will continue to receive the "attached" signal from the key member 21.

Even if the third person moves the door 3 to the predetermined closed position in this state, the receiving part 5*b* is still receiving the "attached" signal from the key member 21, and therefore the flow never proceeds to Step S6 and the door 3 is therefore never locked by mistake.

Note that to bring the door 3 into the locked state, the operator only needs to once remove the key member 21 from the attachment part 22 and insert the key member 21 again into the attachment part 22. This makes the interlock mechanism 5*a* allow the door lock mechanism 8 to bring the door 3 into the locked state as in the above description (Steps S5 to S7).

According to the third embodiment, unlocking of the door is allowed by removing the key member 21 from the attachment part 22 when the unlock condition is established, and locking of the door is allowed only when the door is closed and the key member 21 attached again, so that a simple structure can be used to prevent the door 3 from being brought into the unlocked state or into the locked state by mistake.

Further, since the door lock mechanism 8 is configured to bring the door into the locked state only when the receiving part 5*b* is changed from the state that it is not receiving the "attached" signal to the state that it is receiving the "attached" signal even when the door 3 is moved to the predetermined closed position, it is possible to prevent the door from being brought into the locked state by mistake and processing from being started even when the operator enters the machine keeping the key member 21 attached to the attachment part 22, resulting in improved safety.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

The text of Japanese priority application No. 2010-022878 filed on Feb. 4, 2010, is hereby incorporated by reference.

What is claimed is:

1. A machine tool, comprising:
   a door configured to separate a processing area and an outside of the machine and to be openable/closable;
   a door closed state detection mechanism which detects that the door is located at a predetermined closed position;
   a door lock mechanism which locks or unlocks the door; and
   an interlock mechanism which allows a processing operation when the door is located at the predetermined closed position and is in a locked state,
   wherein the door lock mechanism has a keyhole to which a key member is attachable and outputs a key attached signal indicating a state that the key member is attached to the keyhole or a key unattached signal indicating an unattached state,
   wherein the interlock mechanism allows the door lock mechanism to bring the door into an unlocked state in a state that an unlock condition of the door is established and when the key unattached signal is inputted and, after the door is unlocked, allows the door lock mechanism to bring the door into the locked state only when the key attached signal is inputted in a state that the door closed state detection mechanism detects that the door is located at the predetermined closed position,
   wherein when the key member is attached to the keyhole when the door is in an open state, the key member prevents the door from being located at the predetermined closed position.

2. The machine tool according to claim 1,
   wherein a through hole through which the key member is able to be inserted into the keyhole only when the door is located at the predetermined closed position is formed in the door, and
   wherein the interlock mechanism allows the door lock mechanism to bring the door into the unlocked state when the key member is removed from the keyhole and the through hole.

3. A machine tool comprising:
   a door configured to separate a processing area and an outside of the machine and to be openable/closable;
   a door closed state detection mechanism which detects that the door is located at a predetermined closed position;
   a door lock mechanism which locks or unlocks the door; and
   an interlock mechanism which allows a processing operation when the door is located at the predetermined closed position and is in a locked state,
   wherein a key member is configured to be able to transmit a key member attached signal when the key member is attached to the predetermined position, and wherein the interlock mechanism includes a receiving part receiving the key member attached signal from the key member, and allows the door lock mechanism to bring the door into the locked state only when the receiving part is changed from a state that the receiving part is not receiving key member attached signal from the key member to a state that the receiving part is receiving the key member attached signal in a state that the door closed state detection mechanism detects that the door is located at the predetermined closed position.

* * * * *